United States Patent
Chiang

(10) Patent No.: US 9,451,227 B2
(45) Date of Patent: Sep. 20, 2016

(54) SIGNAL SYNTHESIS CIRCUIT TO SYNTHESIZE LUMA SIGNALS AND CHROMA SIGNALS

(71) Applicant: HON HAI PRECISION INDUSTRY CO., LTD., New Taipei (TW)

(72) Inventor: Huang-Yu Chiang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/498,324

(22) Filed: Sep. 26, 2014

(65) Prior Publication Data

US 2016/0073037 A1   Mar. 10, 2016

(30) Foreign Application Priority Data

Sep. 9, 2014   (TW) .............................. 103131012 A

(51) Int. Cl.
  *H04N 11/14*   (2006.01)
  *H04N 9/77*    (2006.01)
  *H04N 5/42*    (2006.01)

(52) U.S. Cl.
  CPC .................. *H04N 9/77* (2013.01); *H04N 5/42* (2013.01); *H04N 11/14* (2013.01)

(58) Field of Classification Search
  CPC ............ H04N 9/77; H04N 9/78; H04N 5/52; H04N 11/14
  USPC ......................................................... 348/493
  See application file for complete search history.

(56) References Cited

U.S. PATENT DOCUMENTS

| | | | | |
|---|---|---|---|---|
| 2,895,004 A * | 7/1959 | Fredendall | ............... | H04N 9/70 348/711 |
| 3,728,476 A * | 4/1973 | Bates | ...................... | H04N 9/78 333/174 |
| 3,736,370 A * | 5/1973 | Thielking | ................ | H04N 9/72 348/692 |
| 4,558,348 A * | 12/1985 | Bolger | ..................... | H04N 9/78 348/538 |
| 4,567,523 A * | 1/1986 | Hiday | ..................... | H03J 5/244 333/129 |
| 4,668,999 A * | 5/1987 | De La Cierva, Sr. | ........................ | G11B 27/002 348/525 |
| 4,689,663 A * | 8/1987 | Bell | ...................... | H04N 9/641 348/554 |
| 5,172,217 A * | 12/1992 | Perkins | ................. | H04N 11/20 348/663 |
| 5,296,921 A | 3/1994 | Klink | | |
| 2003/0156228 A1 | 8/2003 | Lee et al. | | |
| 2005/0134745 A1 * | 6/2005 | Bacche | .................... | H04N 9/78 348/702 |
| 2010/0149418 A1 * | 6/2010 | Freed | ..................... | H04N 5/208 348/572 |
| 2014/0355774 A1 * | 12/2014 | Quan | ..................... | H04R 29/00 381/58 |

FOREIGN PATENT DOCUMENTS

CN         1047491 C      12/1999

* cited by examiner

*Primary Examiner* — Michael Lee
(74) *Attorney, Agent, or Firm* — Zhigang Ma

(57) ABSTRACT

A signal synthesis circuit synthesizes luma signals and chroma signals output by a video signal source, to output composite video broadcast signals (CVBS). The signal synthesis circuit includes a first gain adjusting unit, a delay unit, and a second gain adjusting unit. The first gain adjusting unit receives and adjusts the gain of the luma signals from the video signal source, and the delay unit delays phases of the luma signals output by the first gain adjusting unit. The second gain adjusting unit receives and adjusts the gain of the chroma signals from the video signal source so that the luma signals output by the delay unit and the chroma signals output by the second gain adjusting unit can be synthesized into the CVBS.

6 Claims, 2 Drawing Sheets

SIGNAL SYNTHESIS CIRCUIT TO SYNTHESIZE LUMA SIGNALS AND CHROMA SIGNALS

FIELD

The disclosure relates to signal synthesis circuits, and particularly to a signal synthesis circuit that can synthesize luma signals and chroma signals.

BACKGROUND

In Federal Communications Commission (FCC) and International Radio Consultative Committee (CCIR) standards, phase differences of luma signals and chroma signals comprising composite video broadcast signals (CVBS) are able to meet 170 nanoseconds output by a radio modulator. It is challenging to design a signal synthesis circuit that can synthesize luma signals and chroma signals into CVBS.

BRIEF DESCRIPTION OF THE DRAWINGS

Implementations of the present technology will now be described, by way of example only, with reference to the attached figures.

DETAILED DESCRIPTION

Figure 1:
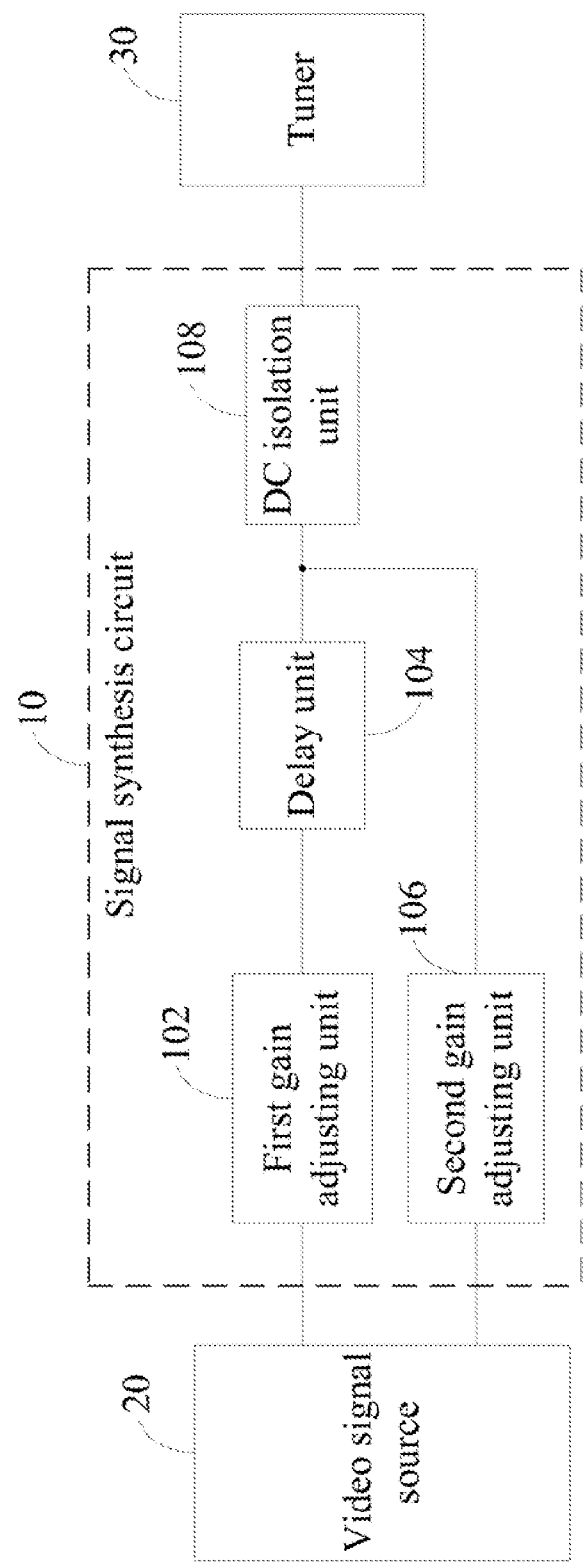
FIG. 1 is a diagrammatic view of a first embodiment of a signal synthesis circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a signal synthesis circuit.

FIG. 1 illustrates a diagrammatic view of a signal synthesis circuit 10. In at least one embodiment, the signal synthesis circuit 10 synthesizes luma signals and chroma signals output by a video signal source 20 to output composite video broadcast signals (CVBS) to a tuner 30. The signal synthesis circuit 10 comprises a first gain adjusting unit 102, a delay unit 104, and a second gain adjusting unit 106. The first gain adjusting unit 102 is coupled to the video signal source 20. The first gain adjusting unit 102 receives luma signals from the video signal source 20 and adjusts gains of the luma signals.

The delay unit 104 is coupled to the first gain adjusting unit 102. The delay unit 104 delays output of the gain-adjusted luma signals. The second gain adjusting unit 106 is coupled to the video signal source 20 and the delay unit 104. The second gain adjusting unit 106 receives chroma signals from the video signal source 20 and adjusts gains of the chroma signals so that the delayed gain-adjusted luma signals output by the delay unit 104 and the gain-adjusted chroma signals output by the second gain adjusting unit 106 can be synthesized into the CVBS, and the tuner 30 can transmit the CVBS to a television (not shown).

In at least one embodiment, the delay unit 104 comprises a plurality of resonance oscillation units coupled in series, and the resonance oscillation units can be inductance capacitance (LC) resonance oscillation circuits. Phase differences of the delayed luma signals output by the delay unit 104 and the chroma signals output by the second gain adjusting unit 106 are 170 nanoseconds.

In at least one embodiment, the CVBS may include direct current (DC) interferences, and the signal synthesis circuit 10 further comprises a DC isolation unit 108. An input terminal of the DC isolation unit 108 is coupled to a node between the delay unit 104 and the second gain adjusting unit 106, and an output terminal of the DC isolation unit 108 is coupled to the tuner 30. The DC isolation unit 108 filters out the DC interferences included in the CVBS so that the CVBS which are free of the DC interferences can be sent to the tuner 30.

In at least one embodiment, gain adjusting values of the first gain adjusting unit 102 and the second gain adjusting unit 106 can be determined by design. For example, the gain adjusting values of the first gain adjusting unit 102 and the second gain adjusting unit 106 are determined by a type of television used for playback.

Figure 2:
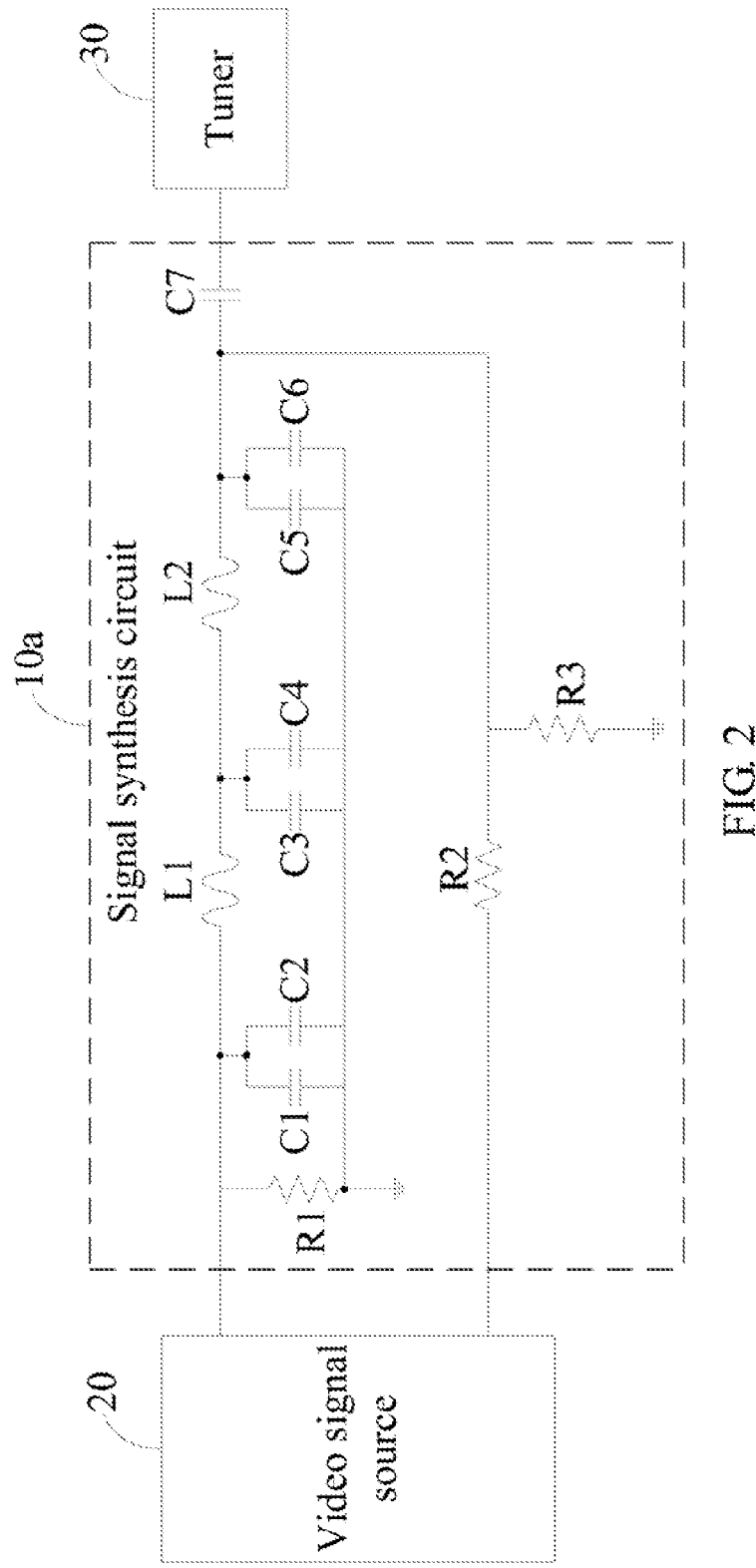
FIG. 2 is a circuit diagram of a first embodiment of a signal synthesis circuit.

FIG. 2 illustrates a circuit diagram of a signal synthesis circuit 10a. In at least one embodiment, the first gain adjusting unit 102 comprises a first resistor R1. A first end of the first resistor R1 is coupled to the video signal source 20, and a second end of the first resistor R1 is grounded. The first gain adjusting unit 102 can adjust the resistance of the first resistor R1 to adjust the gain of the luma signals. The delay unit 104 comprises a first capacitor C1, a second capacitor C2, a third capacitor C3, a fourth capacitor C4, a fifth capacitor C5, a sixth capacitor C6, a first inductor L1, and a second inductor L2. A first end of the first capacitor C1 is coupled to a node between the first resistor R1 and the video signal source 20, and a second end of the first capacitor C1 is grounded. The second capacitor C2 is coupled in parallel to the first capacitor C1. A first end of the first inductor L1 is coupled to a node between the first resistor R1 and the first capacitor C1, a second end of the first inductor L1 is coupled to a first end of the third capacitor C3, and a second end of the third capacitor C3 is grounded. The fourth capacitor C4 is coupled in parallel to the third capacitor C3. A first end of the second inductor L2 is coupled to a node between the first inductor L1 and the third capacitor C3, a second end of the second inductor L2 is coupled to a first end of the fifth capacitor C5, and a second end of the fifth capacitor C5 is grounded. The sixth capacitor C6 is coupled in parallel to the fifth capacitor C5. The delay unit 104 can adjust respective capacitances of the capacitors C1, C2, C3, C4, C5, and C6 and respective inductances of the inductors L1, L2 to adjust phases of the luma signals.

The second gain adjusting unit 106 comprises a second resistor R2 and a third resistor R3. A first end of the second resistor R2 is coupled to the video signal source 20, and a second end of the second resistor R2 is coupled to a node between the second inductor L2 and the fifth capacitor C5. A first end of the third resistor R3 is coupled to the second end of the second resistor R2, and a second end of the third resistor R3 is grounded. The second gain adjusting unit 106 can adjust the respective resistances of the second resistor R2 and the third resistor R3 to adjust the gains of the chroma signals.

The DC isolation unit 108 comprises a seventh capacitor C7. A first end of the seventh capacitor C7 is coupled to a node between the second inductor L2 and the second resistor R1, and a second end of the seventh capacitor C7 is coupled to the tuner 30. The signal synthesis circuit 10*a* filters out any DC interference included in the CVBS, via the seventh capacitor C7.

In at least one embodiment, the resistors R1, R2, and R3, the inductors L1, L2, and the capacitors C1, C2, C3, C4, C5, and C6 can be precise electronic elements which have low errors to reduce offset errors of the CVBS, and the inductors L1, L2 have low DC resistances.

The embodiments shown and described above are only examples. Many details are often found in the art such as the other features of a signal synthesis circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A signal synthesis circuit comprising:
    a first gain adjusting unit configured to receive luma signals from a video signal source and adjust gains of the luma signals;
    a delay unit coupled to the first gain adjusting unit, the delay unit configured to delay phases of the luma signals output by the first gain adjusting unit, wherein the delay unit comprises a plurality of resonance oscillation units coupled in series; and
    a second gain adjusting unit coupled to the delay unit, the second gain adjusting unit configured to receive chroma signals from the video signal source and adjust gains of the chroma signals so that the phase delayed luma signals output by the delay unit and the chroma signals output by the second gain adjusting unit are synthesized into composite video broadcast signals (CVBS).

2. The signal synthesis circuit of claim 1, further comprising a direct current (DC) isolation unit, wherein the DC isolation unit is configured to filter out DC interferences from the CVBS.

3. The signal synthesis circuit of claim 2, wherein the DC isolation unit comprises a capacitor, a first end of the capacitor is coupled to a node between the delay unit and the second gain adjusting unit, and a second end of the capacitor is coupled to a tuner.

4. The signal synthesis circuit of claim 1, wherein the first gain adjusting unit comprises a resistor, a first end of the resistor is coupled to the video signal source and the delay unit, and a second end of the resistor is grounded.

5. The signal synthesis circuit of claim 1, wherein the delay unit comprises:
    a first capacitor with a first end coupled to the first gain adjusting unit and a second end grounded;
    a second capacitor coupled to the first capacitor in parallel;
    a first inductor with a first end coupled to a node between the first capacitor and the first gain adjusting unit;
    a third capacitor with a first end coupled to a second end of the first inductor and a second end grounded;
    a fourth capacitor coupled to the third capacitor in parallel;
    a second inductor with a first end coupled to a node between the first inductor and the third capacitor and a second end coupled to the second gain adjusting unit;
    a fifth capacitor with a first end coupled to a node between the second inductor and the second gain adjusting unit and a second end grounded; and
    a sixth capacitor coupled to the fifth capacitor in parallel.

6. The signal synthesis circuit of claim 1, wherein the second gain adjusting unit comprises:
    a first resistor with a first end coupled to the video signal source and a second end coupled to the delay unit; and
    a second resistor with a first end coupled to a node between the first resistor and the delay unit and a second end grounded.

\* \* \* \* \*